United States Patent
Allmendinger et al.

(10) Patent No.: US 12,036,677 B2
(45) Date of Patent: Jul. 16, 2024

(54) METHOD AND SYSTEM FOR TRANSFERRING AN END EFFECTOR OF A ROBOT BETWEEN ONE END EFFECTOR POSE AND A FURTHER END EFFECTOR POSE

(71) Applicant: KUKA Deutschland GmbH, Augsburg (DE)

(72) Inventors: Felix Allmendinger, Augsburg (DE); Markus Finke, Königsbrunn (DE)

(73) Assignee: KUKA Deutschland GmbH (DE)

( * ) Notice: Subject to any disclaimer, the term of this patent is extended or adjusted under 35 U.S.C. 154(b) by 728 days.

(21) Appl. No.: 17/253,486

(22) PCT Filed: Jun. 12, 2019

(86) PCT No.: PCT/EP2019/065319
§ 371 (c)(1),
(2) Date: Dec. 17, 2020

(87) PCT Pub. No.: WO2019/243128
PCT Pub. Date: Dec. 26, 2019

(65) Prior Publication Data
US 2021/0260760 A1      Aug. 26, 2021

(30) Foreign Application Priority Data

Jun. 19, 2018   (DE) ..................... 10 2018 209 870.0

(51) Int. Cl.
*B25J 9/16*   (2006.01)

(52) U.S. Cl.
CPC .......... *B25J 9/1643* (2013.01); *B25J 9/1612* (2013.01); *B25J 9/1664* (2013.01); *G05B 2219/40099* (2013.01); *G05B 2219/50391* (2013.01)

(58) Field of Classification Search
CPC ...... B25J 9/1643; B25J 9/1612; B25J 9/1664; G05B 2219/40099; G05B 2219/50391; G05B 2219/40431
See application file for complete search history.

(56) References Cited

U.S. PATENT DOCUMENTS

| 5,350,269 A | 9/1994 | Azuma et al. |
| 6,408,224 B1 | 6/2002 | Okamoto et al. |

(Continued)

FOREIGN PATENT DOCUMENTS

| DE | 102007059480 A1 | 6/2009 |
| DE | 102011106321 A1 | 1/2013 |

(Continued)

OTHER PUBLICATIONS

Zlajpah L Ed—Institute of Electrical and Electronics Engineers, "On Time Optimal Path Control of Manipulators with Bounded Joint Velocities and Torques", Proceedings of the 1996 International Conference on Robotics and Automation. Minneapolis, Apr. 22-28, 1996; [Proceedings of the International Conference on Robotics and Automation], New York, IEEE, US, (Apr. 22, 1996), vol. Conf. 13, ISBN 978-0-7803-2989-8, pp. 1572-1577, XP000775090 [A] 1,8.

(Continued)

*Primary Examiner* — Jonathan L Sample
*Assistant Examiner* — Heather J Keniry
(74) *Attorney, Agent, or Firm* — Dorton & Willis, LLP

(57) ABSTRACT

A method for transferring an end effector of a robot between an end effector pose and a further end effector pose, for at least one axis of the robot includes specifying the same uniform progression of the position of the axis, particularly in advance, for the transfer between the one end effector pose and the one further end effector pose, and for transfers between the one end effector pose and a group of other further end effector poses, more particularly in dependence (Continued)

on activation of a control operating mode. For at least one further axis of the robot, different progressions of the position of the further axis are commanded, more particularly during the transferring, for the transfer between the one end effector pose and the one further end effector pose and the transfer between the one end effector pose and the at least one of the further end effector poses.

13 Claims, 1 Drawing Sheet

(56) References Cited

U.S. PATENT DOCUMENTS

| | | | |
|---|---|---|---|
| 9,242,376 B2 * | 1/2016 | Iwasaki | G05B 19/416 |
| 9,283,678 B2 * | 3/2016 | Kuffner, Jr. | B25J 9/1676 |
| 9,592,606 B2 | 3/2017 | Rümping et al. | |
| 9,701,019 B2 | 7/2017 | Eberst et al. | |
| 2016/0000511 A1 * | 1/2016 | Hoffmann | B25J 9/1628 |
| | | | 606/130 |
| 2018/0056513 A1 | 3/2018 | Stimmel | |
| 2019/0168383 A1 | 6/2019 | Haddadin | |

FOREIGN PATENT DOCUMENTS

| | | | | |
|---|---|---|---|---|
| DE | 102014110355 B3 | 8/2015 | | |
| DE | 102015204599 B3 | 8/2016 | | |
| DE | 102016004841 B4 | 1/2018 | | |
| EP | 3979018 A1 * | 4/2022 | | B25J 9/161 |
| WO | WO-2009044287 A2 * | 4/2009 | | A61B 34/30 |
| WO | 2013037693 A2 | 3/2013 | | |
| WO | WO-2016076980 A1 * | 5/2016 | | B25J 15/0625 |

OTHER PUBLICATIONS

European Patent Office; Search Report in related International Patent Application No. PCT/EP2019/065319 dated Oct. 4, 2019; 5 pages.

German Patent Office; Search Report in related German Patent Application No. 10 2018 209 870.0 dated Dec. 7, 2018; 6 pages.

European Patent Office; Office Action in related European Patent Application No. 19 730 750.7 dated Dec. 15, 2022; 8 pages.

L. Zlajpah, "On time optimal path control of manipulators with bounded joint velocities and torques," Proceedings of IEEE International Conference on Robotics and Automation, Minneapolis, MN, USA, 1996, pp. 1572-1577 vol. 2, doi: 10.1109/ROBOT.1996. 506928. keywords: (Optimal control;Torque control;Velocity control ;Manipulator dynamics; Trajectory; Path planning;Robots;Motion planning;Welding;Acceleration).

* cited by examiner

METHOD AND SYSTEM FOR TRANSFERRING AN END EFFECTOR OF A ROBOT BETWEEN ONE END EFFECTOR POSE AND A FURTHER END EFFECTOR POSE

CROSS-REFERENCE TO RELATED APPLICATIONS

This application is a national phase application under 35 U.S.C. § 371 of International Patent Application No. PCT/EP2019/065319, filed Jun. 12, 2019 (pending), which claims the benefit of priority to German Patent Application No. DE 10 2018 209 870.0, filed Jun. 19, 2018, the disclosures of which are incorporated by reference herein in their entirety.

TECHNICAL FIELD

The present invention relates to a method and system for transferring an end effector of a robot between one end effector pose and a further end effector pose, and to a computer program product for carrying out the method.

BACKGROUND

Robot tasks often consist of transferring an end effector of a robot from an initial end effector pose to a target end effector pose, often along a predefined end effector path or sequence of specified end effector poses.

If the robot has more degrees of freedom or axes than the specified poses, this (tasks) redundancy must be resolved in order to ascertain the corresponding axis divisions of the robot.

For this purpose, various methods are known in the literature, which take additional conditions into account.

A slight change in one of the end effector poses may disadvantageously result in significantly different and correspondingly unexpected axis division progressions.

The object of the present invention is to improve the transfer of an end effector of a robot between two end effector poses.

SUMMARY

This object is achieved by a method and a system or computer program product for carrying out a method, as described herein.

According to one embodiment, to transfer an end effector of a robot between one end effector pose and a further end effector pose, depending on an, in particular manual, activation of a control operating mode, in particular (only), if a control operating mode is activated, for one or more axes of the robot, which are hereinafter also referred to without loss of generality as the first or redundant axis/axes, in an execution beforehand or before the transfer, in particular offline, the same, uniform progression of the position of this (first or redundant) axis/axes is/are specified for the transfer between the one end effector pose and the other end effector pose and transfers between the one end effector pose and a group of other further end effector poses.

In one embodiment, the one end effector pose is an initial end effector pose and the further end effector poses are target end effector poses. Similarly, in one embodiment, the one end effector pose may also be a target end effector pose and the further end effector poses may be initial end effector poses. For a more compact, uniform representation, one end effector pose is therefore also referred to as the first end effector pose and the further end effector poses as second end effector poses, without loss of generality, so that in one embodiment the first end effector pose is an initial or target end effector pose, accordingly the second end effector poses may conversely be target or initial end effector poses. The initial and target end effector poses may also be intermediate poses of a (longer) path.

In one embodiment, at least one of these (first or second) end effector pose(s) is/are specified in advance, in one refinement on the basis of a user input and/or a path planning. A target end effector pose within the meaning of the present invention may thus be, in particular, an intermediate point or end point of a planned (robot) end effector path. In one embodiment, the group comprises at least two, in particular at least 10, preferably at least 20, in one embodiment (theoretically) infinitely (possible) further or second end effector poses.

As a result, in one embodiment, an unexpected, pronounced change in the progression of the position of this/these (first or redundant) axis/axes may be avoided and, in one refinement, the safety and/or operability of the robot may thus be improved.

By specifying before the transfer between the first and second end effector pose or by specifying offline, a computing load, in particular time, may advantageously be reduced during the transfer.

According to one embodiment, for one or more further axes of the robot, which are hereinafter also referred to without loss of generality as the second or dependent axis/axes, different progressions of the position of this/these further axis/axes are commanded, in one embodiment depending on an activation of the control operating mode or (only) if the control operating mode is activated and/or when transferring or online, for the transfer between the one or first end effector pose and the one further or second end effector pose and for the transfer(s) between the one or first end effector pose and one or multiple of the other further or second end effector poses of the group.

In one embodiment, therefore, the redundancy of the robot may be advantageously utilized.

In one embodiment, positions of the at least one or first axis are commanded on the basis of or as a function of the predefined uniform progression, in one embodiment, ascertained in particular during the transfer or online. In one embodiment, positions of the at least one further or second axis are additionally or alternatively commanded on the basis of or as a function of the predefined uniform progression, in one embodiment, ascertained in particular during the transfer or online.

As a result, in one embodiment, a computational load, in particular time, may be advantageously (further) reduced during the transfer and/or the redundancy of the robot may be advantageously utilized.

In one embodiment, positions of the at least one or first axis are commanded on the basis of or as a function of specified end effector poses, which in one embodiment are specified on the basis of or as a function of an operator input and/or, in particular Cartesian, path planning. In other words, in one embodiment, one or more end effector poses are each assigned a corresponding position of the at least one or first axis.

Additionally or alternatively, in one embodiment, in particular subsequently, positions of the at least one further or second axis are commanded based on or as a function of predefined positions of the at least one or first axis and/or on the basis of or as a function of (the) specified end effector poses. Thus, in one embodiment relating to one or more predefined end effector poses, one position (each) of the at least one or first axis is initially ascertained, in particular on the basis of the predefined uniform progression of the position of this axis, and the position of the at least one further or second axis is then ascertained in such a way that the end effector assumes the (respective specified) end effector pose in the position of the at least one or first axis ascertained in this way.

In one embodiment, the at least one or first axis is specified or is selectable on the basis of or as a function of a user selection.

In one embodiment, a user is able to avoid an unexpected, pronounced change in the progression of the position of certain selected axes in a targeted manner. As a result, the safety and/or operability of the robot in one refinement may be (further) improved.

In one embodiment, a permissible range for the uniform progression of the position of the at least one or first axis is ascertained, in one refinement on the basis of or as a function of a specified one-dimensional or multi-dimensional restriction, and the uniform progression within this permissible range or specified in such a way or with the proviso that it lies within this permissible range. In one embodiment, the predefined restriction has a one-sided or two-sided travel limitation of the at least one or first axis and/or a limitation to avoid a self-collision of the robot and/or a collision of the robot with one or more obstacles in its work space.

As a result, the predefined limit in one embodiment may advantageously, in particular simply and/or reliably, be adhered to, i.e., in particular, (self) collisions or exceedances of the travel limitation may be avoided.

In one embodiment, the permissible range is ascertained based on or as a function of extremes for the further or second end effector poses, in one refinement on the basis of or as a function of a convex envelope of a predetermined range of (permissible) further or second end effector poses and/or on the basis of or as a function of virtual transfers between the one or first end effector pose and these extremes and/or on the basis of or as a function of an intersection of permissible individual ranges for a further or end effector pose, in particular, of an intersection of permissible individual ranges for each extreme.

As a result, the predefined limit in one embodiment may be particularly advantageously, in particular simply (more simply) and/or reliably (more reliably) adhered to.

Additionally or alternatively, the uniform progression in one embodiment is predefined on the basis of a predefined one-dimensional or multi-dimensional quality criterion. As a result, the uniform progression within the permissible range may in one embodiment be particularly advantageously and/or automatically specified.

In one embodiment, the uniform progression is or becomes parameterized, in particular discretized, based on or as a function of a running parameter, in one refinement on the basis of or as a function of an end effector coordinate or coordinate of an end effector pose or of a path section length.

In this way, the positions of the at least one or first axis and/or of the at least one further or second axis in one embodiment may be particularly advantageously, in particular simply and/or reliably, ascertained.

According to one embodiment, a system, in particular in terms of hardware and/or software, in particular in terms of programming, is configured to carry out a method described herein and/or comprises:

means for specifying the same, uniform progression of the position (for) at least one axis of the robot, in particular, as a function of an activation of a control operating mode and/or in advance for the transfer between one end effector pose and the one further end effector pose and transfers between one end effector pose and a group of other further end effector poses of this axis; and means for commanding different progressions of the position of at least one further axis of the robot, in particular, when transferring, for the transfer between one end effector pose and the one further end effector pose and the transfer between one end effector pose and at least one of the other further end effector poses.

In one embodiment, the system or its means comprises:

means for commanding positions of the at least one axis and/or the at least one further axis on the basis of the uniform progression; and/or means for commanding positions of the at least one axis on the basis of specified end effector poses; and/or means for commanding positions of the at least one further axis on the basis of predefined positions of the at least one axis and/or predefined end effector poses; and/or means for specifying the at least one axis based on a user selection; and/or means for ascertaining a permissible range for the uniform progression of the position of the at least one axis, in particular on the basis of a specified restriction, and specifying the standard progression within this permissible range; and/or means for ascertaining the permissible range on the basis of extremes for the further end effector pose, in particular, a convex envelope of a specified range of further end effector poses, virtual transfers between the one end effector pose and the extremes and/or on the basis of an intersection of permissible individual ranges for a further end effector pose; and/or means for specifying the uniform progression on the basis of a specified quality criterion; and/or means for parameterizing, in particular discretizing, the uniform progression on the basis of a running parameter, in particular, an end effector coordinate or path section length.

A means within the meaning of the present invention may be configured in hardware and/or in software, may comprise, in particular a data-connected or signal-connected processing unit, in particular, a digital processing unit, in particular a microprocessor unit (CPU) preferably including a memory and/or bus system, and/or one or multiple programs or program modules. The CPU may be configured to process commands that are implemented as a program stored in a memory system, to detect input signals from a data bus and/or to output output signals to a data bus. A storage system may comprise one or multiple, in particular different, storage media, in particular optical, magnetic, solid-state and/or other non-volatile media. The program may be configured in such a way that it embodies or is capable of carrying out the methods described herein, so that the CPU is able to carry out the steps of such methods and thus, in particular, is able to control or regulate the robot. In one embodiment, a computer program product may comprise, in particular, a non-volatile storage medium for storing a program or including a program stored thereon, an execution of this program prompting a system or a controller, in particular a computer, to carry out the method described herein or one or multiple of steps thereof.

In one embodiment, one or multiple, in particular all, steps of the method are carried out completely or partially automatically, in particular by the system or its means. In one embodiment, the system includes the robot.

The robot, in one refinement, a robot arm, comprises in one embodiment at least three, in particular at least six, in one embodiment at least seven (movement) axes or joints, in particular swivel joints. Additionally or alternatively, the robot in one embodiment comprises a mobile base, in particular a chassis, and/or one or multiple linear axes, on which in one refinement the robot arm is arranged.

The present invention may be particularly advantageously used in such robots.

In one embodiment, a pose has a one-, two- or three-dimensional position and/or a one-, two- or three-dimensional orientation; it may in particular consist thereof or be defined thereby.

In one particularly advantageous application, the robot is a patient positioning robot ("PPR") with an, in particular six-axis, robot arm which is arranged on a linear axis, wherein in one embodiment the linear axis is the first axis, in particular, is selected as the first axis, and/or the first and second end effector pose differ only in one orientation or rotational position about a reference direction of an irradiation unit, in particular the uniform progression is or becomes parameterized, in particular discretized, based on this orientation or rotational position. In one embodiment, the position of the linear axis then changes only when this orientation or rotational position changes and remains advantageously constant with all changes in the other end effector coordinate, in particular, in its position and/or orientation about axes transverse to the reference direction of the irradiation unit.

Nonetheless, the present invention is of progression not limited thereto, but may be advantageously used, particularly when the position of objects to be gripped on a conveyor and/or their storage location differ, when processing of points on a component, in particular a body or the like, that are far apart, whose position differs from component to component, as well as for other robot applications being used without being limited thereto.

Further advantages and features will be appreciated from the exemplary embodiments described herein.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
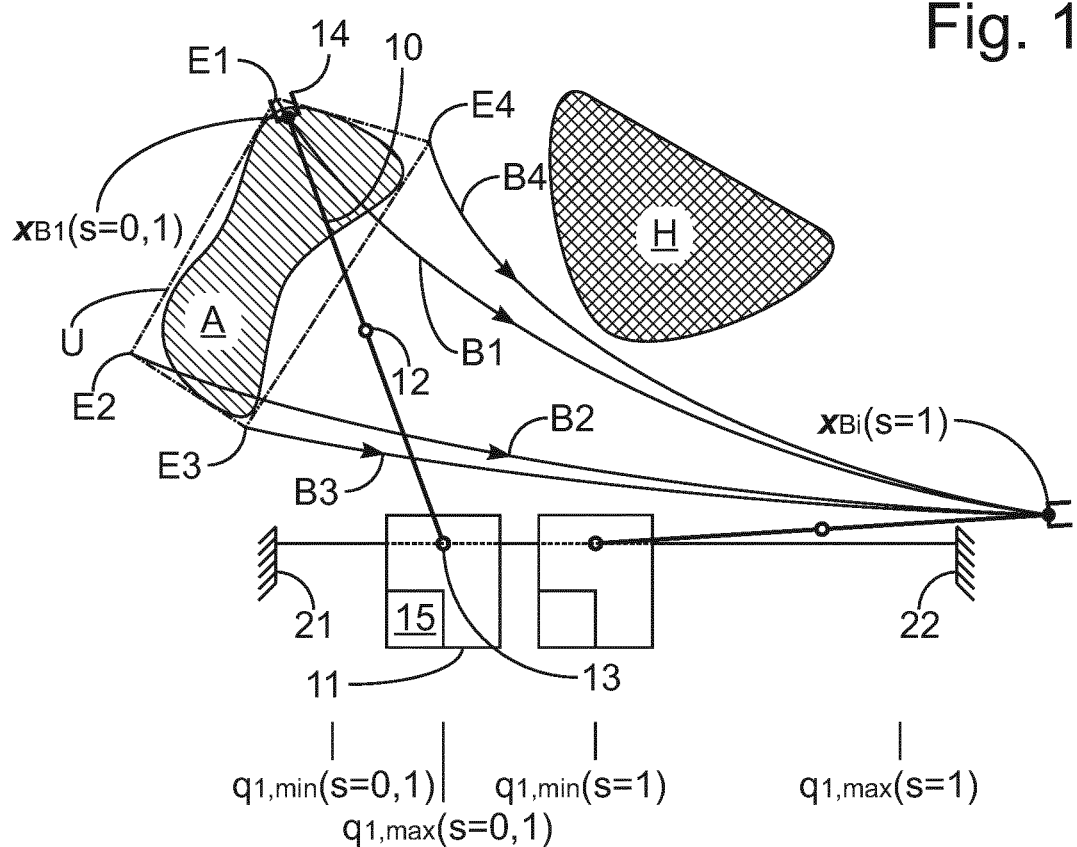
FIG. 1 depicts a system according to one embodiment of the present invention including a robot with a linear axis and a robot arm arranged thereon with an end effector.

FIG. 1 shows a system according to one embodiment of the present invention including a robot with a base 11 which may be moved on a linear axis with travel limitations 21, 22, a robot arm 10 with a swivel joint 12, which is situated in a further swivel joint 13 on the base 11 and comprises an end effector 14, and a robot controller 15.

The end effector 14 is to be transferred from arbitrary initial end effector poses x within a specified initial range A into the same target end effector pose without colliding with an obstacle H, these poses each being (defined) (by) the two-dimensional position of the end effector 14 in the image plane of FIG. 1 and the robot with the two swivel joints 12, 13 and the linear axis or these three axes being redundant with regard to this task.

In a first offline step S10, the initial range A is specified, a convex envelope U is placed around this range A, and all four corner points E1-E4 of this envelope, which form the extremes of the group of possible or permitted initial end effector poses, are virtual transfers B1-B4 planned between the extremes and the target end effector pose are planned, taking into account the travel limitations 21, 22 and avoiding a collision with the obstacle H.

For clarification, the robot is delineated in FIG. 1 by way of example in two positions of its linear axis, in which its end effector assumes or includes the end effector $X_{B1}(S=0.1)$ or $X_{B1}(S=1)$.

In a second offline step S20, a permissible individual range for the positions of the linear axis is ascertained for each of these virtual transfers B1-B4 or extremes E1-E4.

For this purpose, the limits $q_{1,\ min}$, $q_{1,\ max}$ of the permissible individual range for the transfer B1 or from the extremum E1 to the target end effector pose for two values $s=0.1$, $s=1$ of a running parameter are shown in FIG. 1 in the form of a normalized path section length $0 \leq s \leq 1$.

Figure 2:
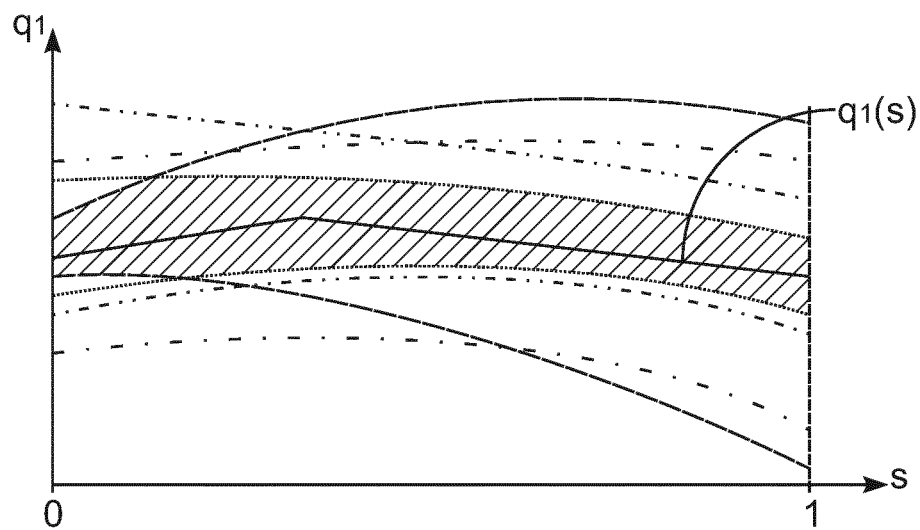
FIG. 2 illustrates a permissible range for the uniform progression of the position of the linear axis.
Figure 3:
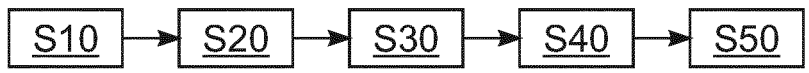
FIG. 3 is a flow chart that illustrates a method for transferring the end effector between one end effector pose and one further end effector pose according to one embodiment of the present invention.

In FIG. 2, these limits are indicated by dash-dotted lines above the running parameter s, the corresponding limits of the permissible individual ranges for the other transfers B2-B4 or from the extremes E2-E4 to the target end effector pose are indicated by dashes, dots or double-dashes. They are ascertained in discrete steps $ds=0.1$.

Then, in step S20, a permissible (total) range for a uniform progression $q_1(s)$ of the position of the linear axis is ascertained as the intersection of these permissible individual ranges, which is indicated by hatching in FIG. 2.

In a third offline step S30, the uniform progression $q_1(s)$ is subsequently specified on the basis of a specified quality criterion, for example in such a way that an average distance from the limits of the permissible (overall) range is maximal or the like.

If the end effector 14 is then to be transferred from any of the group of permitted initial end effector poses A to the target end effector pose, a path is planned therefor in a first online step S40 and parameterized (x(s)) with the running parameter $0 \leq s \leq 1$.

In a second online step S50, the respective position of the linear axis is ascertained for discrete steps ds of this running parameter in each case from the predefined uniform progression $q_1(s)$, the positions of the two rotary joints are ascertained from this position of the linear axis and from the corresponding end effector pose x(s) 12, 13 and these positions are commanded.

In this way, it is ensured that the linear axis has the same, predictable or reproducible behavior for each transfer from any of the initial end effector poses A into the target end effector pose. In addition, the offline specification of the uniform progression $q_1(s)$ may reduce the computing load.

Although exemplary embodiments have been explained in the preceding description, it is noted that a large number of modifications are possible. It is also noted that the exemplary embodiments are merely examples that are not intended to restrict the scope of protection, the applications and the structure in any way. Rather, the preceding description provides the person skilled in the art with guidelines for implementing at least one exemplary embodiment, with various changes, in particular with regard to the function and arrangement of the described components, being able to be made without departing from the scope of protection as it arises from the claims and from these equivalent combinations of features.

In addition or alternatively, for example, arbitrary target end effector poses may also be provided within a specified target range.

Instead of a standardized path section length s, an end effector coordinate may advantageously also be used directly, for example, the so-called kick angle of an end effector of a patient positioning robot about a reference direction of an irradiation unit.

In one embodiment, a uniform progression of the position of the linear axis of the patient positioning robot may similarly be specified offline, as explained above with reference to S10-S30, then a path of the six degrees of freedom of the end effector including this kick angle may be planned as explained above with reference to S40, and then for this path or kick angle in each case the associated position of the linear axis and from this the position of the arm of the patient positioning robot or its axis divisions are ascertained and commanded in each case from the predetermined uniform progression of the position of the linear axis for discrete kick angle changes.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS

10 Robot arm
11 Robot base
12, 13 Robot arm swivel joint (further or second axis)
14 End effector
15 Robot controller
21, 22 Linear axis travel limitation
A Initial range
B1-B4 Virtual transfer
E1-E4 Extreme
H Obstacle
U Envelope
X 2-D position of the end effector (end effector pose)
S Path section length (run parameter)
$q_1$ Position of the first or linear axis

What is claimed is:

1. A method for transferring an end effector of a robot between a first end effector pose and a second end effector pose, the method comprising:

for at least one first axis of the robot, specifying the same, uniform progression of a position of the at least one first axis for the transfer between the first end effector pose and one second end effector pose, and for transfers between the first end effector pose and a group of other second end effector poses;

for at least one second axis of the robot, commanding different progressions of a position of the at least one second axis for the transfer between the first end effector pose and the one second end effector pose, and for the transfer between the first end effector pose and at least one of the other second end effector poses; and ascertaining a permissible range for the uniform progression of the position of the at least one first axis;

wherein the uniform progression is specified within the permissible range;

wherein the permissible range is ascertained based on extreme positions for the second end effector pose, comprising a specified area of second end effector poses, wherein the specified area of second end effector poses is defined by a convex polygon envelope.

2. The method of claim 1, wherein at least one of:

the uniform progression of the position of the first axis is specified in advance of the transfer;

different progressions of the position of the at least one second axis are commanded during the transfer; or specifying the uniform progression of the position of the at least one first axis or commanding progressions of the position of the at least one second axis is performed as a function of an activation of a control operating mode of the robot.

3. The method of claim 1, further comprising:

commanding positions of the at least one first axis and/or the at least one second axis on the basis of the uniform progression.

4. The method of claim 1, further comprising commanding positions of the at least one first axis on the basis of specified end effector poses.

5. The method of claim 1, wherein positions of the at least one second axis are commanded on the basis of at least one of:

specified positions of the at least one first axis; or
specified end effector poses.

6. The method of claim 1, characterized in that the at least one first axis is specified on the basis of a user selection.

7. The method of claim 1, wherein the permissible range is ascertained on the basis of a specified restriction.

8. The method of claim 1, further comprising parameterizing the uniform progression based on a running parameter.

9. The method of claim 8, wherein at least one of:

parameterizing the uniform progression comprises discretizing the uniform progression; or the running parameter is an end effector coordinate or a path section length.

10. A system for transferring an end effector of a robot between a first end effector pose and a second end effector pose, the system comprising:

means for specifying, for at least one first axis of the robot, the same, uniform progression of the position of the at least one first axis for the transfer between the first end effector pose and one second end effector pose, and for transfers between the first end effector pose and a group of other second end effector poses;

means for commanding, for at least one second axis of the robot, different progressions of the position of the at least one second axis for the transfer between the first end effector pose and the one second end effector pose, and for the transfer between the first end effector pose and at least one of the other second end effector poses; and means for ascertaining a permissible range for the uniform progression of the position of the at least one first axis;

wherein the uniform progression is specified within the permissible range;

wherein the permissible range is ascertained based on extreme positions for the second end effector pose, a specified area of second end effector poses, wherein the specified area of second end effector poses is defined by a convex polygon envelope.

11. The system of claim 10, wherein at least one of:

the uniform progression of the position of the FIRST axis is specified in advance of the transfer;

different progressions of the position of the at least one second axis are commanded during the transfer; or specifying the uniform progression of the position of the at least one FIRST axis or commanding progressions of the position of the at least one second axis is performed as a function of an activation of a control operating mode of the robot.

12. A computer program product for transferring an end effector of a robot between a first end effector pose and a second end effector pose the computer program product including machine-readable program code stored on a non-transitory storage medium, the program code, when executed by a computer, causing the computer to:

for at least one first axis of the robot, specify the same, uniform progression of the position of the at least one first axis for the transfer between the first end effector pose and one second end effector pose, and for transfers between the first end effector pose and a group of other second end effector poses;

for at least one second axis of the robot, command different progressions of the position of the at least one second axis for the transfer between the first end effector pose and the one second end effector pose, and for the transfer between the first end effector pose and at least one of the other second end effector poses; and ascertain a permissible range for the uniform progression of the position of the at least one first axis;

wherein the uniform progression is specified within the permissible range;

wherein the permissible range is ascertained based on extreme positions for the second end effector pose, a specified area of second end effector poses, wherein the specified area of second end effector poses is defined by a convex polygon envelope.

13. The method of claim 1, wherein the uniform progression is further specified on the basis of a specified quality criterion.

\* \* \* \* \*